A. P. FRIDSTRÖM.
SAW.
APPLICATION FILED AUG. 7, 1908.
941,705.
Patented Nov. 30, 1909.
2 SHEETS—SHEET 1.
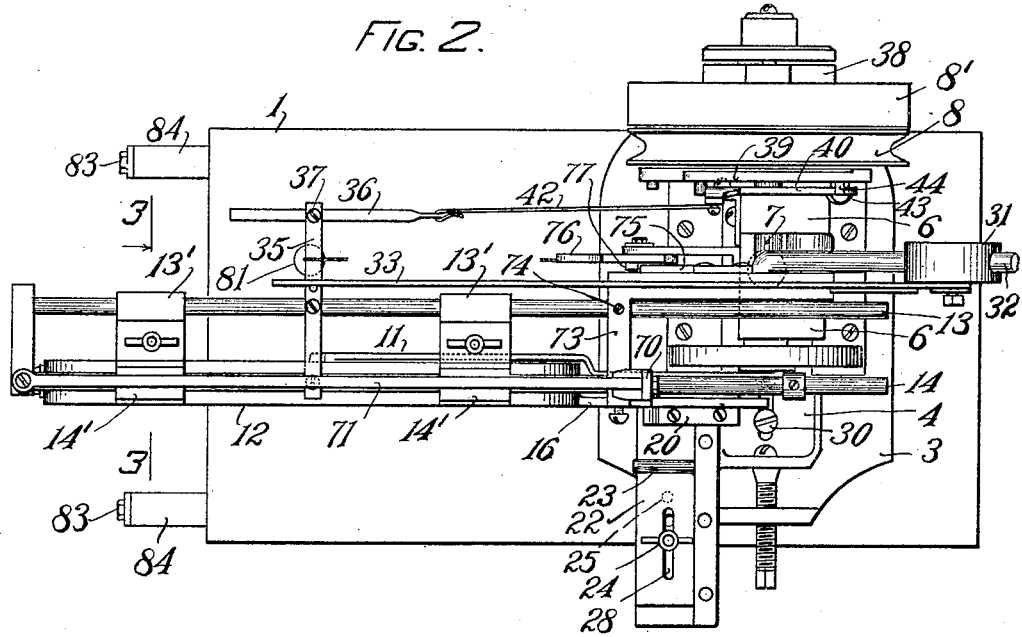
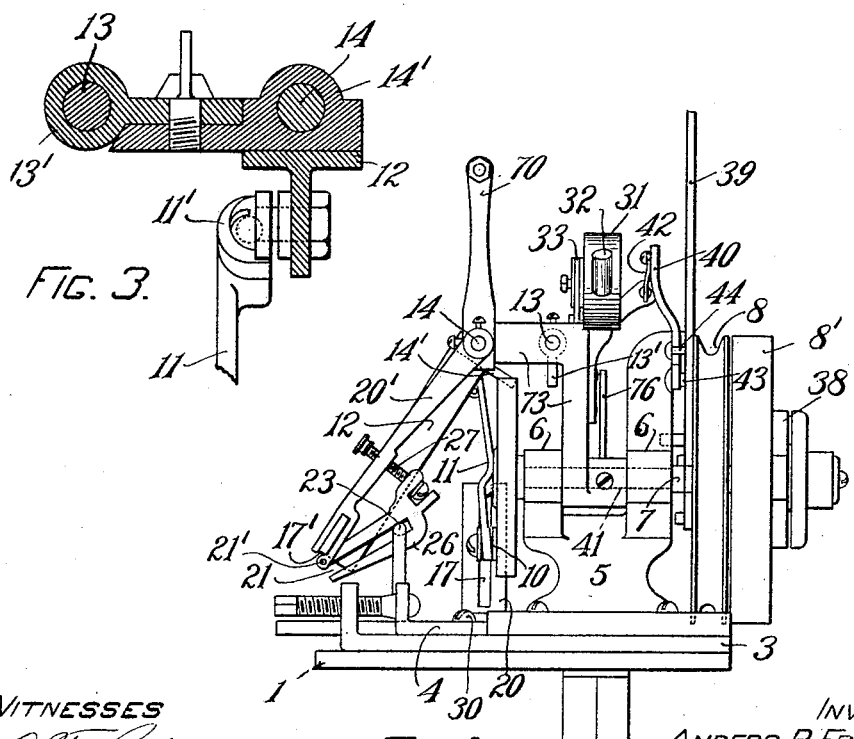
WITNESSES
INVENTOR
ANDERS P. FRIDSTRÖM
BY HIS ATTORNEYS
Mitchell, Chadwick & Kent

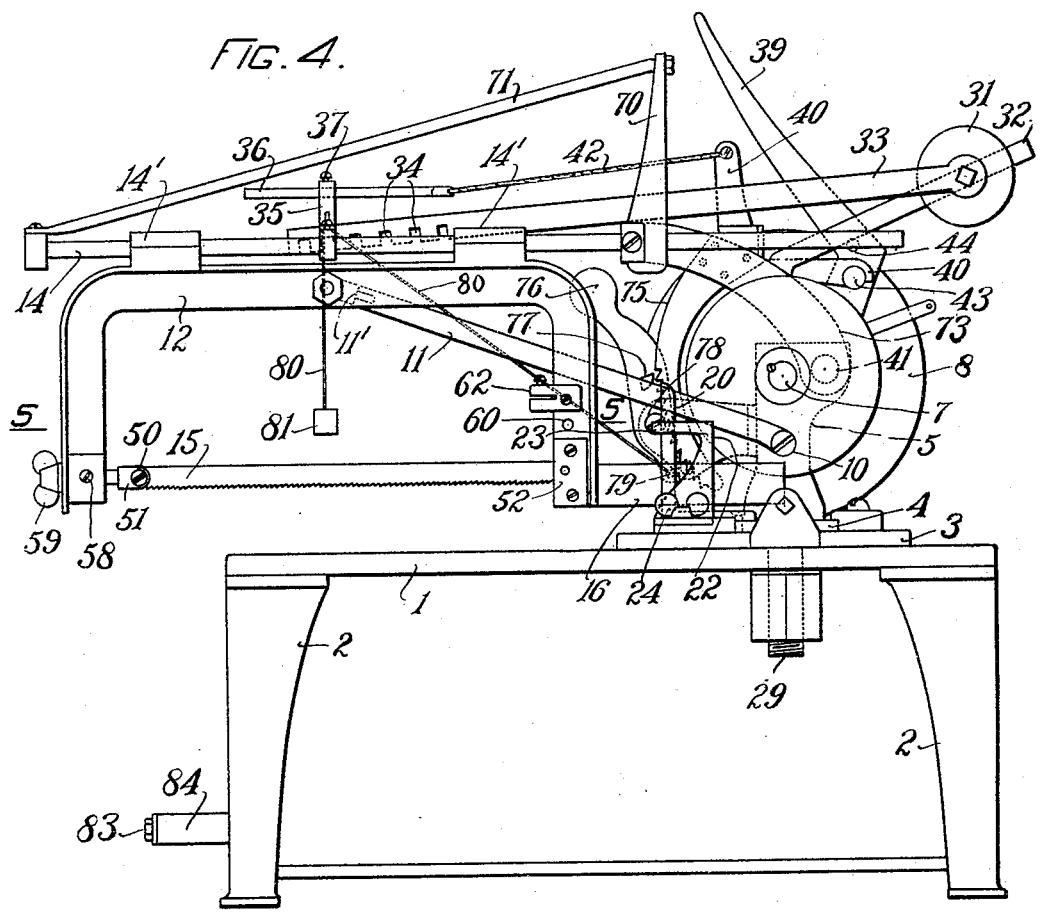
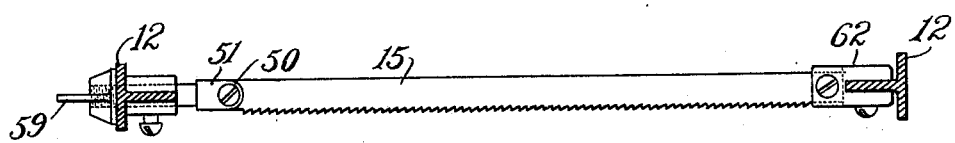
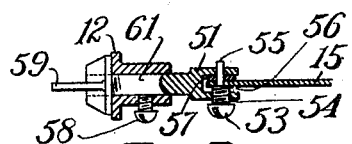

UNITED STATES PATENT OFFICE.

ANDERS P. FRIDSTROM, OF EVERETT, MASSACHUSETTS.

SAW.

941,705.

Specification of Letters Patent.   Patented Nov. 30, 1909.

Application filed August 7, 1908. Serial No. 447,348.

*To all whom it may concern:*

Be it known that I, ANDERS P. FRIDSTROM, a citizen of Sweden, residing at 13 Alfred street, Everett, in the county of Middlesex and State of Massachusetts, have invented new and useful Improvements in Saws, of which the following is a specification.

This invention relates to saws.

More particularly it relates to machine saws adapted for working on metals, such as iron, steel, brass, etc.

The objects of the invention are to improve mechanism for operating and adjusting such saws, and particularly to provide means for conveniently adjusting the saw to the requirements of the work, such as cutting the work at a bevel, either a simple bevel or a skew bevel, or cutting horizontally.

The apparatus herein described as embodying the invention also contains features which I believe to be novel, by which the initial position of the saw with respect to the work may be adjusted to bring the saw to mark, or to change the angle of the cut of the saw upon the work either about a vertical or a horizontal axis, and to set the feed of the saw so that the saw will stop when the cutting has proceeded to a predetermined point; also means for automatically easing the saw blade and allowing lateral adjustment thereof while at work.

It is also among the objects of the invention to provide the other improvements in construction shown in the accompanying drawings or hereinafter described.

The drawings illustrate one embodiment of the invention in which,

Figure 1 represents a rear elevation; Fig. 2 represents a plan of the same (with the part 20' removed); Fig. 3 is an elevation in section on the line 3—3 of Fig. 2, showing a detail on a larger scale; Fig. 4 is a side elevation of the complete machine, (with the part 20' removed); Fig. 5 is a plan of a detail, on a larger scale, represented as if a section were made in Fig. 4 at the line 5—5, but with the saw blade turned to a horizontal position in the same location which it occupies in Fig. 4; Fig. 6 is a plan of a detail, in section, showing the jaw at the forward end of the saw blade.

In the drawings is represented a table 1 having legs 2, on which table is a plate 3, adjustable thereon, on which slides another plate 4, (see Fig. 1) from which a standard 5 rises containing journals 6, 6, in which is a shaft 7. This shaft has one or more pulleys 8, 8' at one end, adapted to receive power by means of a belt or otherwise. In the drawing, two pulleys are represented, one having a grooved periphery adapted to receive power from a round belt and the other 8' heavy in construction, constituting a fly wheel and having a flat periphery adapted to receive power from a flat belt. Under ordinary circumstances when the saw is working in a straight fore and aft direction, this belt and pulley will be the motive power; but when the saw is adjusted to cut at an angle not straight fore and aft the round belt and pulley 8 may be used and the flat one disconnected. At the other end of shaft 7 is a crank 10 with which is connected a rod 11 which drives the saw. The saw is set in a D-frame 12 of ordinary construction and slides upon two round bars 13 and 14 which constitute ways. The saw frame including the ways 13 and 14 is preferably pivoted on the standard 5 just over or back of the shaft 7, the pivot in the drawings being marked 41. Pieces are provided on the saw frame, marked respectively 13' and 14', which constitute means to support the frame on these ways and which form the bearings when the frame slides to and fro thereon. The frame is D-shaped and carries the saw 15 between the extremities of the D as customary heretofore; but the method of attaching the saw thereto and the adjustments which may be effected I believe to be novel and these will be described in detail hereinafter. The separability of the bearing plates 13' on rod 13 from the plates 14' on rod 14, as hereinafter fully described, is also a feature of novelty and contributes to what I consider one of the most important features of the invention, namely, the adjustability of the saw-frame about the bar 14 as an axis so that the saw is capable of being set at an angle to the vertical and is capable of cutting in a plane inclined to vertical. These bearing plates, 13', 14', are represented as joined together in Figs. 3 and 2 by a thumb screw which is clearly seen; and by removal of this thumb screw, they may be separated as seen in Fig. 1, leaving the saw frame supported on one of them, 14'; the other one, 13′, and the way 13 being temporarily not in use when they are thus separated. The construction of these various features and of the parts which coöperate therewith will now be described more in detail.

At a portion of the D-frame remote from the ways 13, 14 is a tail piece or projecting guide bar 16, (Fig. 4) which is preferably fixed about opposite the end of the saw, as shown. This tail piece moves with the saw and travels to and fro endwise in a slot in a guiding block, the position of which slot determines the inclination of the saw blade, either in a vertical plane or at an angle. In the drawings this slot is represented in both positions, in Fig. 1, where the vertical position is marked 17 and the inclined position is marked 17′. In the vertical position the slot is formed in a block 20 firmly affixed to the plate 4 on which the standard 5 is set. When the saw is set to cut at an inclination a block 20′ is used with slot marked 17′, the block 20′ being mounted pivotally on the bar 14. In Fig. 1 the slot 17′ is in use and the slot 17 is not in use. Consequently the block 20 which contains the slot 17 might be removed; but it is portrayed in the figure in order to show it and its location in rear elevation. In Figs. 2 and 4 this block 20 is seen in use. A swivel connection is provided, as at 11′, where the rod 11 joins the saw frame. The slight amount of sidewise displacement of the joint, incidental to setting the saw at an inclination, is provided by a slight looseness of the connecting rod upon the crank pin 10, as represented greatly exaggerated in Fig. 1; or by a slight bending of rod 11. As the connection to the saw frame is very near the bar 14, about which the saw frame is pivoted, the lateral displacement of the forward end of this rod 11 is very little.

Means is provided to adjust the inclination of slot 17′. This consists of a standard 22 which may be fixed at various distances from the vertical plane under bar 14 and which is provided with a horizontally extending lug 23, parallel to that bar, which rides in an auxiliary slot 21 which is (in effect) a slot in block 20′. This is seen in use in Fig. 1. In Figs. 2 and 4 it is not in use and might be removed, but is left in place in order to show its shape and method of attachment.

The lug shown in the drawings is of fixed height above the level of the plate 4, and is best seen in the side elevation. According to its distance laterally from the bar 14 it causes the block having slot 17′ to stand at varying inclinations and consequently sets the bar 20′, the tail piece 16, and the D-frame 12 with its saw blade, at various inclinations. The standard bearing this lug, may be made fast, when so adjusted, by any suitable means. The means shown consist of a slot 28, in the base 22 on which the lug is supported, and a thumb-screw 24 passing through the slot into one of the holes 25 in plate 4. A rough adjustment may be made by selecting the proper hole 25 and pushing the standard 22 to the proper place, the screw sliding in the slot. A more delicate adjustment of the angle may then be made by the micrometer means provided as follows:—The block 26 containing slot 21 is at its lowest end pivoted to the bar 20′ at 21′ and at its upper end is attached to said bar by a screw 27. Therefore the angle between the main bar 20′ and its block 26 containing the auxiliary slot 21 in which rides lug 23 is variable; and after the parts have been roughly adjusted and made fast by means of the parts 24 and 25, the adjustment may be completed by turning the screw 27, thus swinging bar 20′ about bar 14 until its slot 17′, and consequently the saw blade, stand at the desired inclination from the vertical. When the saw is operated its direction of feed will be determined by the guidance which the lug 23 riding in slot 21 exerts upon block 20′ and the saw frame 12. To enable the tail piece 16 to enter the slot 17′ when the slot is set outside the vertical plane under bar 14, the bearing pieces 13′, 14′ which normally hold the D-frame upon its two bar ways 13 and 14 are separable. When separated, the portion attached to bar 13 becomes temporarily out of action while the portions attached to bar 14 form the bearings which support the D-frame and which slide to and fro upon said bar when the saw is in action. As said bar is round they also constitute a bearing on which the D-frame can swing as far as necessary about the bar 14 as if it were a pivot.

Having adjusted the saw to the proper inclination it will frequently be found that it is not in proper adjustment with respect to the mark where the cutting of the work is to begin. Hitherto it has been necessary under such circumstances, to unfasten and remove the work to make it conform to the position of the saw; but if the work be heavy this is difficult and moreover it cannot be done with a high degree of precision. The invention provides means for making this adjustment quickly and easily, consisting of the horizontal adjusting screw seen clearly in Figs. 1 and 2, by which the plate 4 carrying the saw and its driving mechanism may be adjusted laterally with respect to the plate 3 on which it rests, one plate sliding on the other, and the clamping screw 30.

To cut a skew bevel, by which is meant to cut a surface which is neither vertical nor parallel to a straight fore and aft line, provision is made by mounting plate 3 pivotally on the table 1, there being a vertical screw bolt 29 passing through the table into the plate 4. When the bolt is loose the plate 4 and its contents may be adjusted pivotally about this bolt; and when adjusted as desired they may be locked by tightening the nut on the bolt. Obviously this adjustment may be used at all inclinations of the saw blade, including that in which it is vertically under the bar 14, in which latter case, the saw will cut a vertical surface forming a bevel with respect to a straight fore and aft line. The saw may be adjusted to any angle about the vertical pivot 29, and may be set at any inclination about rod 14 as explained above, in which case it will cut a skew bevel.

When the saw is used for vertical cutting the block 20, having a fixed vertical slot 17, may be employed, thus dispensing with the necessity for a test or measurement of the angle of adjustment each time. In this case the tail piece 16 must gradually fall in the slot as the saw feeds downward and therefore the slot is open at the top, and runs down vertically to the lowest limit to which the saw can be fed downward. When bar 20' is used, the slot 17' need be only long enough to receive the guide piece 16, as the block 20' swings about the same bar 14 on which the D-frame and tail piece are mounted.

When in operation the saw is fed downward by its own weight pressing upon the work. The degree of weight thus pressing upon the work may be regulated by a balance weight 31 on an arm 32 rigidly attached to the saw frame and projecting to the rear of the shaft 7. It will be understood that the saw frame is pivoted at 41, close to the shaft 7, (Figs. 4 and 1) being supported on arm 73 which is there pivoted; and this arm 32 is rigidly fixed to any convenient portion of the arm 73, riveted heads of the attachment thereof being seen in Fig. 1, just at the right of the reference numeral 73. Consequently, any weight 31 upon the arm 32 counterbalances to a degree the weight of the saw frame; and its effect varies according to the position it occupies on the arm. Pushing it further back increases its moment about pivot 41 and decreases the net force with which the saw feeds into the work. Such a weight is not new but I show in my drawing a convenient means of adjusting such weight, which I believe to be novel, viz: the rod 33 reaching forward therefrom and having notches 34, 34 adapted to engage any convenient non-reciprocating portion of the forward part of the machine, as the cross-bar 35, which is a spacing bar for joining and stiffening the bar-ways 13, 14 on which the D-frame slides. The operator can conveniently grasp the forward end of this rod and, unlatching it, can move the weight forward or back on its rod 32, and can latch it by notches 34. The cross-bar 35 serves another useful function in the present invention by supporting a rod 36, being provided with a clamp 37 for holding said rod at any position at which said rod 36 may be adjusted therein. It is contemplated that a clutch will be inserted in the driving mechanism between the driving wheels 8 or 8' and shaft 7, and a spring is provided throwing this clutch normally open. Any suitable form of clutch and control spring may be employed the exterior of the clutch being shown in the drawing at 38, and being controlled by a lever 39. A latch 40 holds the lever in the clutch-closed position, there being a notch in the latch which engages a pin 43 on the control lever 39. The movement of the latch is limited by a stop pin 44 above it. The latch is in the form of a bell crank, and a cord or chain 42 runs between its tail end and the rod 36. The ways or frame on which the saw travels gradually feed downward, swinging around pivot 41, as the saw proceeds with its work. Consequently the distance between the rod 36 and the latch 40 gradually increases. It is contemplated that the rod 36 shall be adjusted to such a position that when the saw has cut its way downward through the work to precisely the desired degree, this rod will have pulled the latch 40 out of the engagement and thus will throw the clutch and stop the machine.

If the saw binds in its cut while working no convenient adjustment known to me has heretofore been possible to stop the binding without re-adjusting the work. In the apparatus here described this may be accomplished automatically by means of the screw 50. A saw blade of ordinary type is employed, having holes at each end through which pins pass to fasten it within jaws 51 located forward and 52 located aft. In the present invention one pin at 52, may be of any ordinary or suitable construction. The other pin at 51, is peculiar and novel in that it fits into relatively wide-spreading jaws; and has a knurled or slotted head 53; a screw-threaded portion 54 next to the head, which screws into the nearer jaw, and a smooth and unthreaded portion 55 which forms the end of the pin and which passes through the saw and the other jaw 51. A shoulder 56 is formed between the threaded portion and smooth portion; and normally the saw is clamped by this shoulder against the farther jaw 51. If it be found that the saw is binding when in action, and adjustment is needed toward the nearer jaw, the screw may be partly unscrewed, thus moving the shoulder 56 and allowing the saw a little leeway to find its proper position laterally; without, however, removing the longitudinal fore and aft hold upon the saw, because the pin 55 still passes through the hole in the saw. If adjustment is needed toward the farther jaw 51, the washer 57 may be removed.

Provision is made for varying the angle of the saw blade with respect to the D-frame by providing a series of pin holes 60, 60 in the aft portion of the frame, in any of which the saw may be fastened; and also by providing a special jaw piece 62, having a jaw set horizontally or transversely of the frame instead of parallel with it as usual. This piece is pivoted on the rear portion of the frame in any of the pin holes 60 there, and is adapted to receive a saw blade in the customary manner. The jaws at the forward end are fastened by a shank 61 which passes through the frame and is tightened exteriorly by a thumb screw 59 and fastened by a set screw 58. This shank is rotatable in the frame. Consequently the aft end of the blade may be removed from its accustomed position near the edge of the D-frame, may be swung upward toward the transverse jaw 62, seen in Fig. 4, at the same time being rotated so that its edge is presented sidewise instead of downward to the work, and the saw will then cut horizontally or at such other angle as it may be set by the various adjustments above described. Owing to the higher location of the transverse jaws 62 upon the frame a blade of suitable or ordinary length will be received, notwithstanding the jaws project within the D-frame; or if preferred these jaws 62 may be set at the edge of the frame in the place occupied by jaws 52 in Fig. 4. This is the arrangement represented in Fig. 5.

The saw frame may be braced by an upright 70 and a stay-rod 71. The manner in which the frame is connected to its pivotal mounting is shown best in Fig. 4 where the arm 73 is seen, mostly in dotted lines, which at one end is pivoted at 41 and at the other end is joined to the base of the upright 70 and at 74, 74 supports the two bars 13 and 14 on which saw frame slides. An auxiliary piece 75 riveted to the arm 73 as seen in dotted lines in Fig. 4 runs downward and is provided with a rack having teeth pointing downward. Obviously, this rack 75 moves up and down whenever the saw frame is lifted or depressed. A dog 76 is provided having a tooth 77 adapted to engage said rack, the dog being pivoted at 78. The dog is so balanced that normally it lies in the position illustrated in Fig. 4, in which it is shown out of engagement with the rack. When in this position the saw frame may be raised or lowered freely about its pivot 41. Under its pivot 78 is an eye-hole 79 in which a cord 80 may be attached passing forward and hanging over the cross bar 35 and bearing at its end a small weight 81 which serves to hold the end of the cord in a place where it is easily accessible. The dog is so hung that normally the weight of its head 76 overbalances the pull of the weight 81 and cord 80 on its tail. If the operator pulls this cord the dog will be thrown against the rack 75 and the saw will be held up in any desired position by engagement of the tooth 77 with the rack. Upon lifting the saw a little the dog will fall out of its engagement, and the saw is then free.

The table 1 may be provided with any desired or suitable means for holding the work stationary thereon, as is customary in machinery of this sort. In addition to this the machine comprises means for adjustably holding work which is too high to stand on the table under the saw. This is the pins 83 projecting forward of the legs, each being equipped if desired with a roller 84 to facilitate adjustment of the work thereon to proper position, after which it may be clamped to legs 2. When a long saw cut is being made at a bevel it may happen that the angle at which the saw blade is set requires adjusting in order to follow the desired line of the cut. This may be accomplished without stopping the machine, by the operator making the necessary slight changes in the screw 27; and if necessary the pin holding the end of the saw blade may be loosened to allow the blade to adjust itself automatically to the conditions. The fastenings shown for the forward end of the saw blade may if desired be duplicated at the aft end thereof, in which case, by adjustment of the blade and the screw 27, the saw may be made to cut strictly on the desired line for any distance.

It will be observed that the tail piece 16 and its slot 17 or 17' might be reversed, and substituted for each other, in position, the slot being formed in the frame 12 and the pin being supported where the block 20 or 20' now is represented in drawings. In the claims this connection is referred to as a pin and slot connection, the tail piece 16 being considered to be the equivalent of a pin.

I claim:—

1. A saw and feeding means therefor operated by gravity, in combination with a rack moving with the saw, a dog stationarily supported, pivotally mounted, adapted to engage the rack and balanced so that it is normally disengaged, and a cord extending therefrom to the forward part of the machine and arranged to pull the dog into engagement with the rack.

2. A saw blade and a frame supporting it, pivotally mounted and feeding by gravity, in combination with a rod tending to balance them on the pivot and a weight movable to varying distances on the rod thereby varying the balancing force; and a second rod adapted to move the weight on the first rod, there being a series of notches in the second rod adapted to engage the top of a stationary element, whereby said second rod and the weight may be latched in various positions.

3. In a saw, the combination of a frame adapted to hold the saw blade, two parallel bars forming ways, there being bearings of said frame thereon, means to disconnect the frame from one of said bars, whereby the frame may swing about the axis of the other bar and be set at an inclination to its position when bearing on both.

4. In a saw, the combination of a frame adapted to hold the saw blade, a way on which the frame travels, and means to impart endwise reciprocating travel to the frame; a way adapted to support and guide the frame so traveling; and means to maintain the frame at varied angles to the vertical plane of said way.

5. In a saw, the combination of a frame adapted to hold the saw blade, a bar forming a way on which the said frame travels, a stationary guide bearing against the frame at a distance from the vertical plane of said way, whereby the inclination of said frame is determined.

6. In a saw, the combination of a frame adapted to hold the saw blade, a bar forming a way on which the said frame travels, a stationary guide bearing against the frame at a distance from the vertical plane of said way, whereby the inclination of said frame is determined, said guide comprising a pin and slot connection, between the frame and a stationary part of the machine, the pin being on one of these members and a block containing the slot being on the other of these members.

7. In a saw, the combination of a frame adapted to hold the saw blade, a bar forming a way on which the said frame travels, a stationary guide bearing against the frame at a distance from the vertical plane of said way, whereby the inclination of said frame is determined, said guide comprising a pin and slot connection, between the frame and a stationary part of the machine, the pin being on one of these members and a block containing the slot on the other, that on the stationary member being adjustable to various distances from a fixed plane passing through the bar way.

8. In a saw, the combination of a frame adapted to hold the saw blade, a bar forming a way on which the said frame travels, a stationary guide bearing against the frame at a distance from said way, whereby the inclination of said frame is determined said frame being adjustable about said way as a center, and means to adjust the guide to various distances from a fixed plane passing through said way.

9. In a saw, the combination of a frame adapted to hold the saw blade, a bar forming a way on which the said frame travels, a stationary guide bearing against the frame at a distance from said way, whereby the inclination of said frame is determined said frame being adjustable about said way as a center, and means to adjust the guide to various distances from a fixed plane passing through said way, comprising a plate movable on the support for the way and means to fasten the plate in various positions, said plate carrying one part of the guiding device.

10. In a saw, the combination of a frame adapted to hold the saw blade, a bar forming a way on which the said frame travels, a stationary guide bearing against the frame at a distance from said way, whereby the inclination of said frame is determined said frame being adjustable about said way as a center, and means to adjust the guide to various distances from a fixed plane passing through said way; said guide comprising two parts, one mounted on the saw frame and one stationary on the machine, one of these having fixed adjustably upon it a block, in which the means for engaging the other part is located; there being means to vary the adjustment of said block with respect to the part on which it is mounted.

11. In a saw, the combination of a frame adapted to hold the saw blade, a bar forming a way on which the said frame travels, a stationary guide bearing against the frame at a distance from said way, whereby the inclination of said frame is determined said frame being adjustable about said way as a center, and means to adjust the guide to various distances from a fixed plane passing through said way; said guides comprising two parts, one mounted on the saw frame and one stationary on the machine, one of these having fixed adjustably upon it a block, in which the means for engaging the other part is located; there being means to vary the adjustment of said block with respect to the part on which it is mounted, the block being mounted pivotally and having a screw adjustable fastening at a distance from its pivot.

12. The combination with a saw blade of a frame adapted to hold the blade, a way upon which the frame travels, a plate supporting the way, and an under plate supporting the first mentioned plate, guiding means for the upper plate to slide upon the under in a lateral direction with respect to said way, and a screw connection for adjusting the distance between these two plates; the under plate being stationary with respect to the work upon which the saw operates.

13. In a saw, the combination of a movable frame for holding the saw blade; jaws on the frame to receive the ends of the blade; the jaws at one end having a pin, with one portion adapted to pass through a hole in the end of the blade, and with a larger portion; there being a shoulder between these two portions adapted to clamp the blade in said jaw, the smaller portion of the pin having length sufficient to permit playroom for the saw thereon.

14. In a saw, the combination of a movable frame for holding the saw blade; jaws on the frame to receive the ends of the blade; the jaws at one end having width for play of the blade between them and having a pin holding the saw, said pin projecting through both jaws, screwing in one of them and having a shoulder adapted to clamp the blade toward one of them, the screw being long enough to be partially withdrawn without releasing the saw.

15. In a saw, the combination of a frame holding the saw blade, the frame being pivotally mounted and feeding by gravity, means to set and guide the frame at an inclination and means for adjusting the position of the blade in said frame.

16. In a saw, the combination of a frame holding the saw blade, the frame being pivotally mounted and feeding by gravity means to set and guide the frame at an inclination and means for adjusting the position of the blade in said frame, the guiding means being adjustable and the blade being automatically adjustable laterally in its frame.

17. In a saw, the combination of a frame adapted to hold a saw blade, a driving shaft and a connecting rod joining the shaft and the frame, there being ways supporting the frame normally perpendicular to the driving shaft; and means to set the frame at a different angle with the driving shaft, there being a swivel connection in the connecting rod between said shaft and frame.

18. In a saw, the combination of a frame adapted to hold the saw blade, a way on which the frame travels and a stationary guide for the frame at a distance from said way comprising a pin and slot connection between the frame and a stationary part of the machine located approximately at one end of the saw blade.

Signed by me at Boston this 25th day of July 1908.

ANDERS P. FRIDSTROM.

Witnesses:
　EVERETT E. KENT,
　HJALMAR L. FRIDSTROM.